(12) United States Patent
Chu et al.

(10) Patent No.: US 7,735,804 B2
(45) Date of Patent: Jun. 15, 2010

(54) SEALING VALVE

(75) Inventors: Ying Chen Chu, Tainan (TW); I-Cheng Wang, Tainan (TW); Hsing-Chen Chen, Tainan (TW); Chien-Chih Yu, Tainan (TW)

(73) Assignee: Highlight Tech Corp., Tainan (TW)

( * ) Notice: Subject to any disclaimer, the term of this patent is extended or adjusted under 35 U.S.C. 154(b) by 435 days.

(21) Appl. No.: 11/933,433

(22) Filed: Nov. 1, 2007

(65) Prior Publication Data
US 2009/0114866 A1   May 7, 2009

(51) Int. Cl.
*F16K 25/00* (2006.01)
(52) U.S. Cl. .................................. 251/204; 251/203
(58) Field of Classification Search ............... 251/193, 251/203, 204, 326
See application file for complete search history.

(56) References Cited

U.S. PATENT DOCUMENTS

| 5,626,324 | A | * | 5/1997 | Nakamura et al. | ............ 251/58 |
|---|---|---|---|---|---|
| 6,237,892 | B1 | * | 5/2001 | Ito | .............................. 251/203 |
| 6,390,449 | B1 | * | 5/2002 | Ishigaki et al. | ............... 251/193 |
| 7,066,443 | B2 | * | 6/2006 | Ishigaki | ....................... 251/195 |
| 7,100,892 | B2 | * | 9/2006 | Iwabuchi | ..................... 251/187 |
| 7,198,251 | B2 | * | 4/2007 | Kondoh | ...................... 251/193 |
| 7,234,679 | B2 | * | 6/2007 | Ishigaki | ....................... 251/116 |

* cited by examiner

*Primary Examiner*—John K Fristoe, Jr.
(74) *Attorney, Agent, or Firm*—Leong C. Lei

(57) ABSTRACT

A sealing valve is disclosed. The valve comprises a valve seat, a power element and an elevation section. The valve seat is provided with through hole from front to rear, and the upper end of the valve seat is connected to a guiding body having a guiding slot and a directional slot. The power element is mounted at the upper end of the valve seat to control the elevating movement of the elevation section. The elevation section is downward extended to mount within a sealing element. The sealing element is driven to the through hole to seal the hole or to be driven away from the through hole, this avoid wearing within the valve seat in the course of sliding.

6 Claims, 9 Drawing Sheets

PRIOR ART

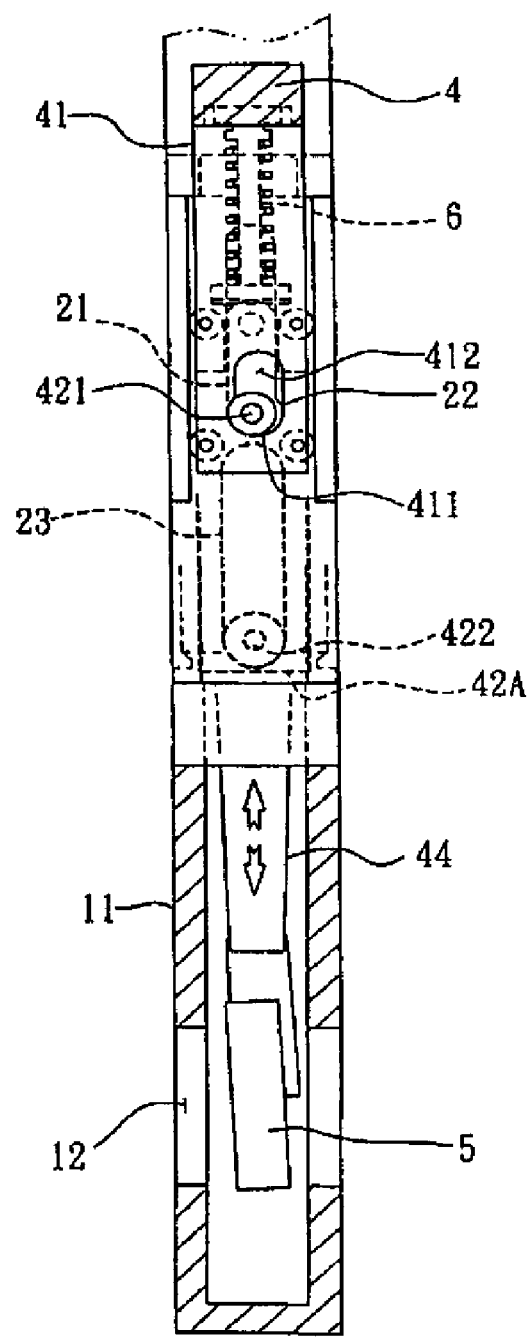
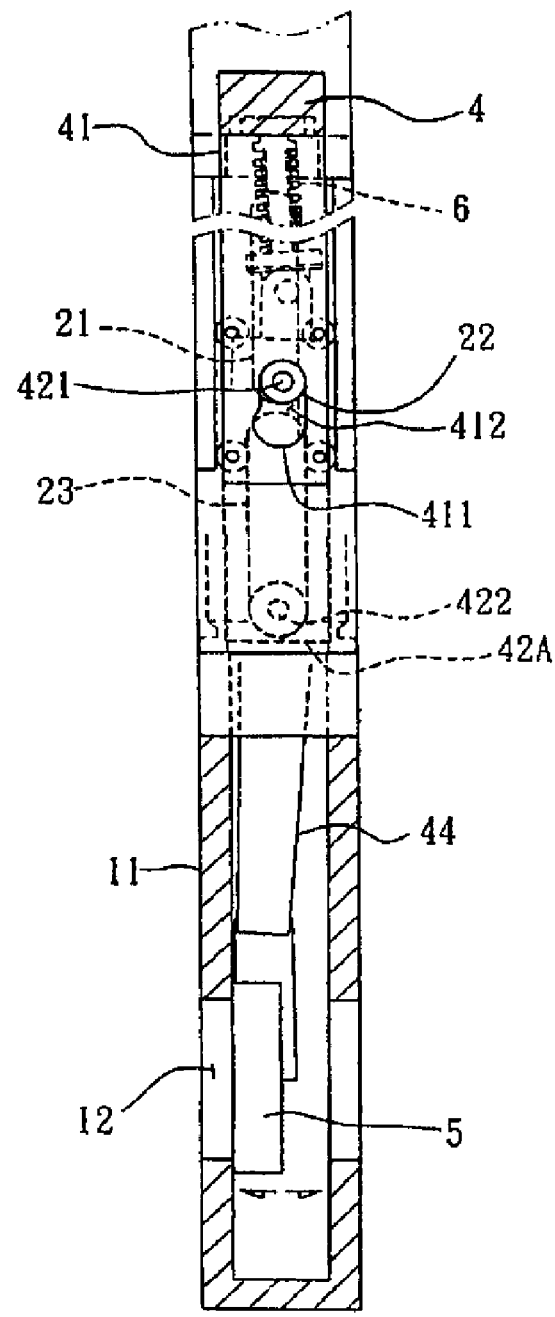
FIG. 11  FIG. 12

SEALING VALVE

BACKGROUND OF THE INVENTION (a) Technical Field of the Invention

The present invention relates to valve, and in particular, a sealing valve for sealing the communication between two tightly sealed rooms.

(b) Description of the Prior Art

FIGS. 1 to 2 show conventional sealing valve for use to isolate between two chambers A. The first sealing valve 10 is provided with a first valve seat 101, and the first valve seat 101 is in communication with a first passage 102, and the first valve seat 101 is connected to a first power element 103. The first power element 103 is downwardly extended to form a first sealing plate 1031 (as shown in FIG. 1). When the first sealing plate 1031 is used, the first power element 103 pushes the first sealing plate 1031 to rub against the edge of the passage 102. This will cause a wear to the sealing plate 1031 and a gap is formed.

Referring to FIGS. 3 and 4, the second sealing valve 20 has a crankshaft 201, and the second sealing plate 202 is in communication with a second passage 203. The crankshaft 201 pushes the sealing plate 202 to seal the passage 203. The crankshaft 201 will wear and particles will form.

As shown in FIGS. 5 and 6, there is shown a third sealing valve 30 having a third sealing plate 301, a connecting rod 302 and a third passage 303. The rear of the third sealing plate 301 eccentrically pushes the connecting rod 302 and similarly, the connecting rod 302 wears out and particles form. The particles will in communication with the third passage 303.

In view of the above, the first 10, second 20 or the third sealing valve 30 will be worn out and particles will form. Therefore precision of the sealing valve is questionable. Accordingly, it is an object of the present invention to provide a sealing valve which mitigate the above drawback.

SUMMARY OF THE INVENTION

The primary purpose of the present invention is to provide a sealing valve comprising a valve seat having through holes in communication front the front to the rear of the seat and the upper end of the valve seat is connected to a vertical guide body, and the upper section of the guide body is provided with a vertical guiding slot passing through the left and right of the guiding body, and the end of the lower side of the guiding slot is tapered to form a slanting end; the guiding body at a position being lower than the guiding slot provided in parallel with a vertical directional guiding slot; a power element mounted at the upper end of the valve seat and being provided with a up and down retractable protruded rod; an elevation section being mounted at the upper end of the valve seat and connected and controlled by the end section of the protruded rod; the elevation section parallel to the guiding slot provided with a first displacement element and the lower end of the first displacement element being provided with a horizontal eccentric slot, and the directional slot being arranged with a second displacement element, and the second displacement element protruding mounted with a directional terminal slidably move along the guiding slot, and the second displacement element downward extended to form a sealing element for sealing and opening of the rear side of the through hole for fluid.

A further objection of the present invention is to provide a sealing valve, wherein at the rear of the eccentric slot and at upward raise of the eccentric slot, a resisting slot is provided.

Yet another object of the present invention is to provide a sealing valve, wherein the middle of the elevation section is provided with a second displacement element and a shaft rod passing through the left and right of the valve seat is provided to the second displacement element, and the right and left side of the second displacement element are pivotally connected to an eccentric terminal, and the eccentric terminal is connected to a guiding slot having a guiding body and connected to an eccentric slot, the left and right side of the second displacement element are provided with a positioning plate extended downwardly, and the positioning plate is externally connected to the directional terminal, and the directional terminal is sliding along the directional guiding slot of the guiding body, and the second displacement element is mounted downwardly with an actuating rod and the lower end of the actuating rod is connected to a sealing element, and the upper end of the second displacement element is a rotating element having mounted with a rotating base seat, a pivoting body, eccentric rod and an elastic element and the rotating base seat is mounted to the second displacement element and the upper end of the base seat being pivotally connected to the pivot body, and the pivot body connected to the eccentric rod, and the upper end of the eccentric rod are mounted with a holding cap with an extended surface, and the eccentric rod is mounted with the elastic element, and the elastic element is restricted at the pivot body by the holding cap and the holding cap is upwardly mounted to a limiting chamber extended to the elevation section.

Still a further object of the present invention is to provide a sealing valve, wherein the guiding body is further provided with a limiting, reciprocating slot to correspond with the first displacement element and the first displacement element is further mounted with rolling element which in contact with the lateral wall of the reciprocating slot.

Still yet another object of the present invention is to provide a sealing valve, wherein the actuating rod is mounted with a soft body to isolate dust from entering the valve seat.

Another object of the present invention is to provide a sealing valve, the upper end of the valve seat corresponding to the through hole is mounted with a power element, and the power element upwardly extended to form a protruded rod, the end section of the protruded rod is connected to the lower side of the elevation section.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 11 is a schematic view of the sealing valve of the present invention.

FIG. 12 is a schematic view of the eccentric position of the sealing valve in accordance with the present invention.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
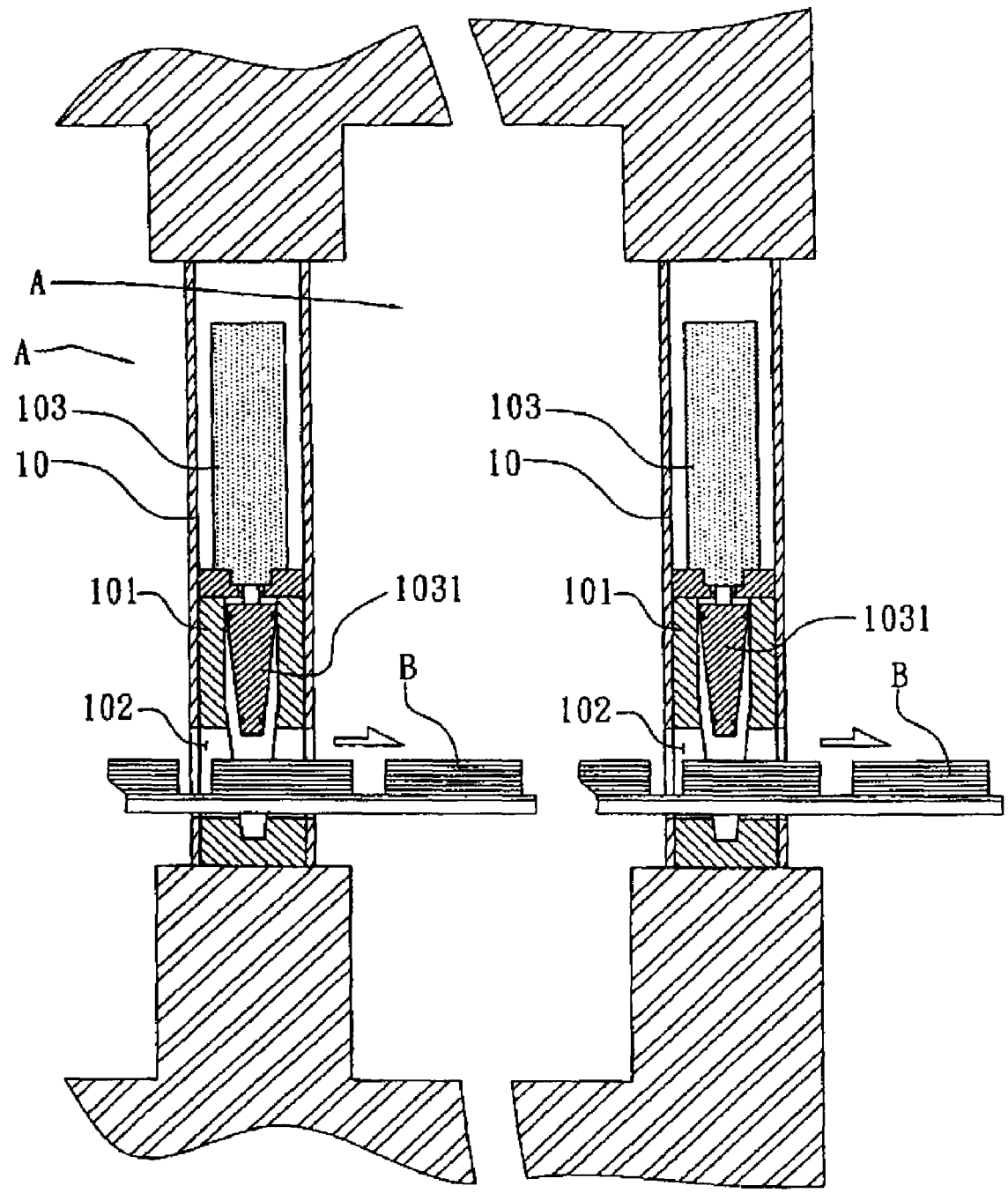
FIGS. 1 to 6 are drawings showing a conventional sealing valve.
Figure 2:
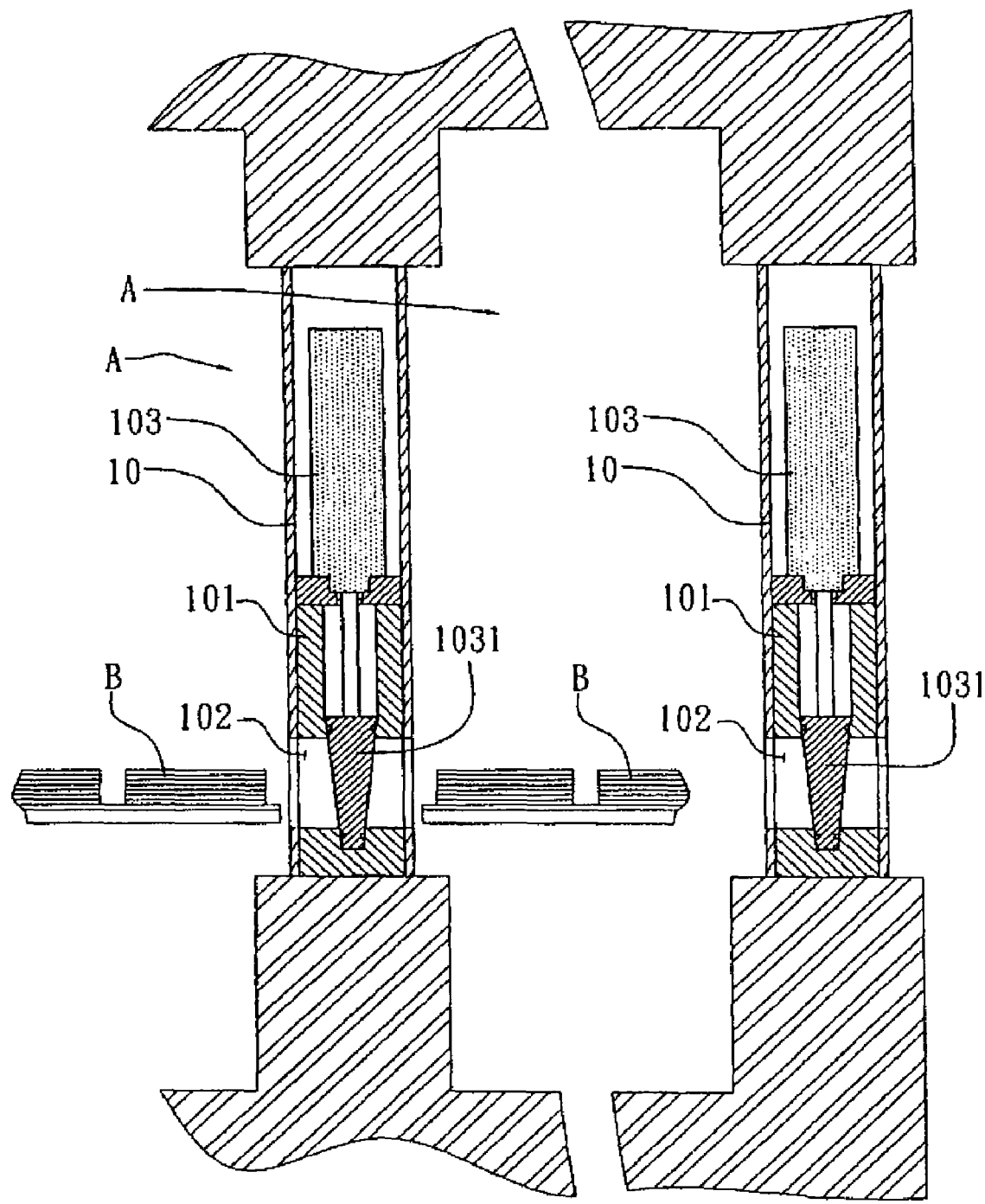
Figure 3:
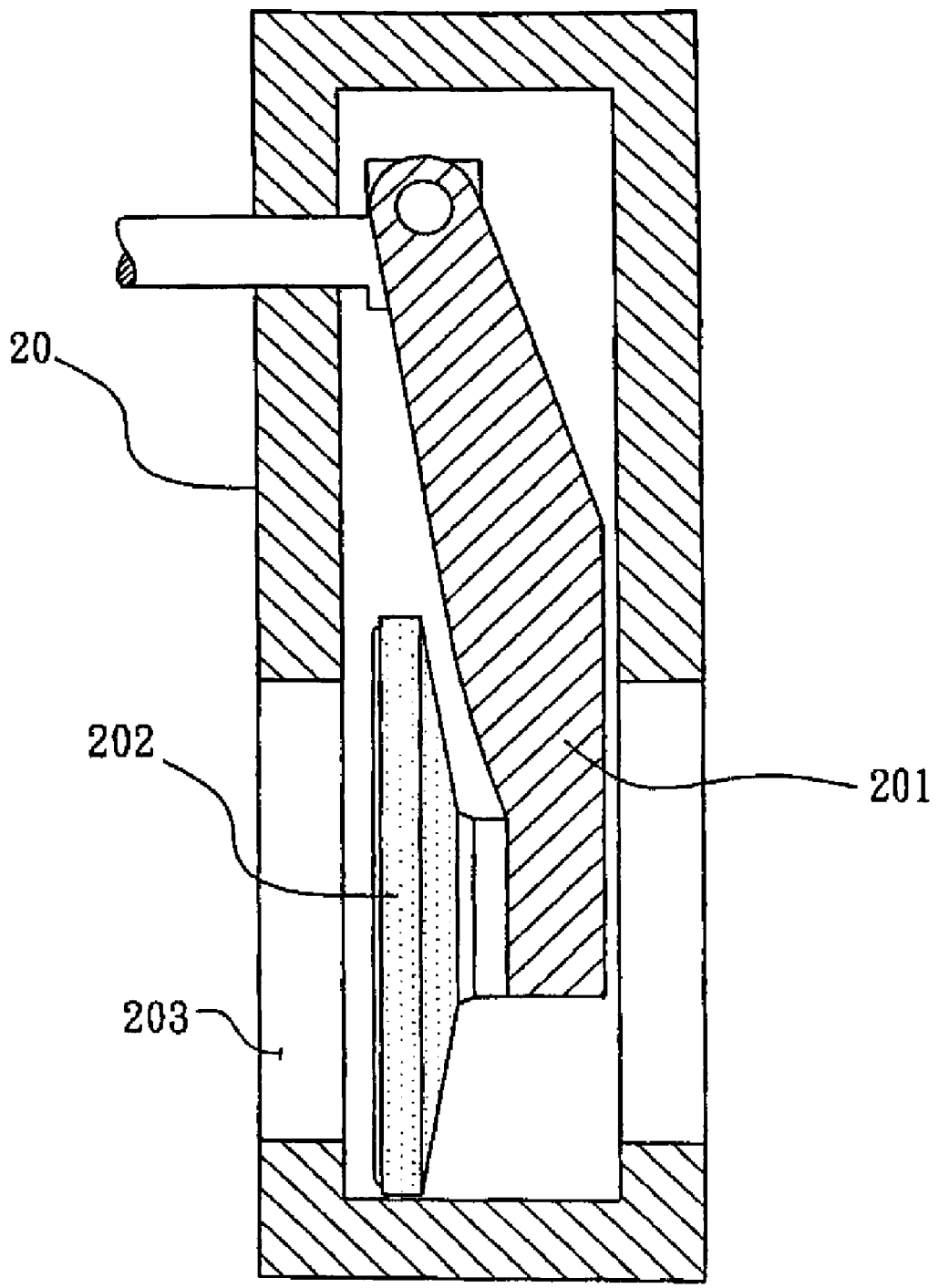
Figure 4:
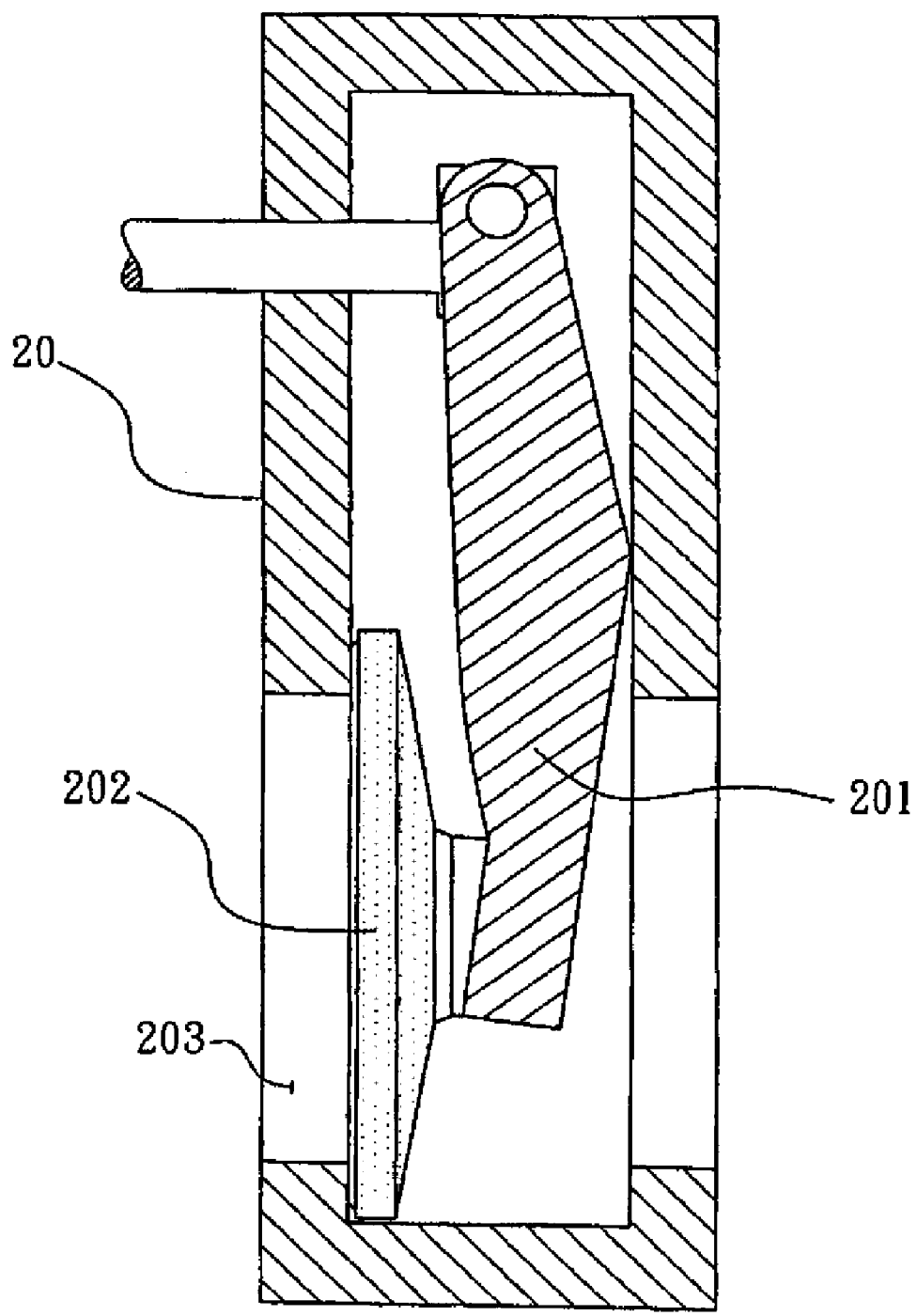
Figures 5, 6:
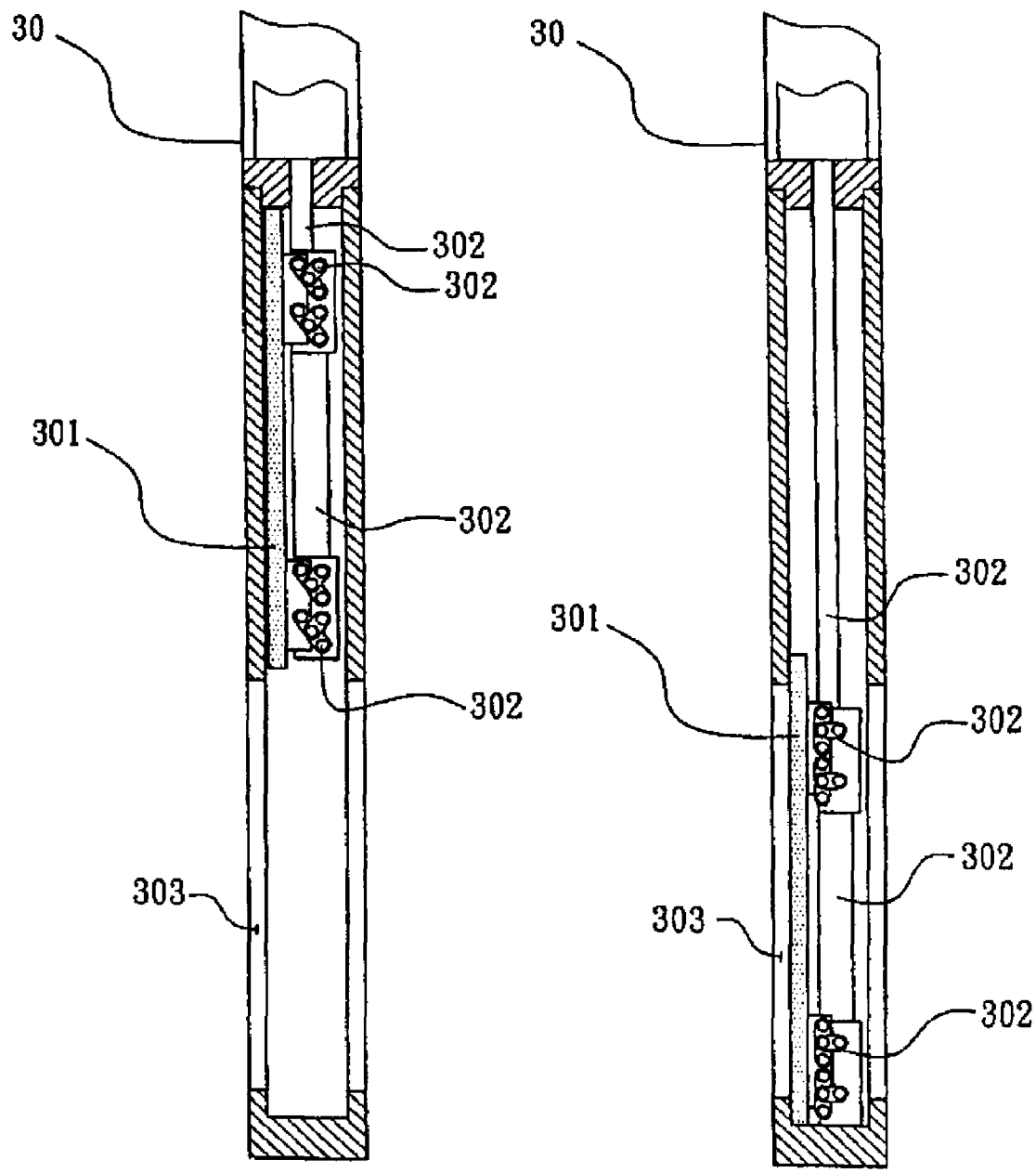
Figure 7:
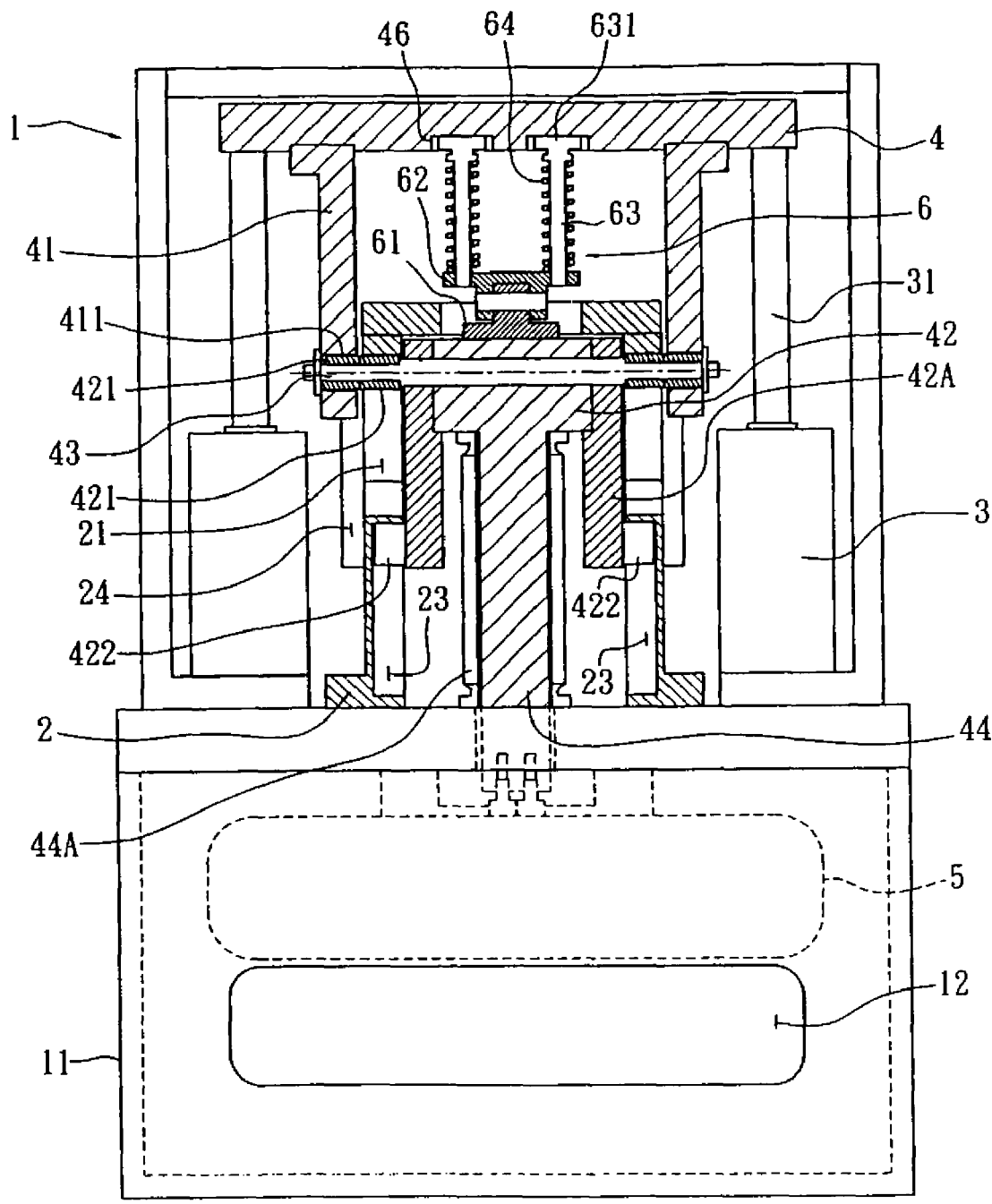
FIG. 7 is a perspective view of a sealing valve of the present invention.
Figure 8:
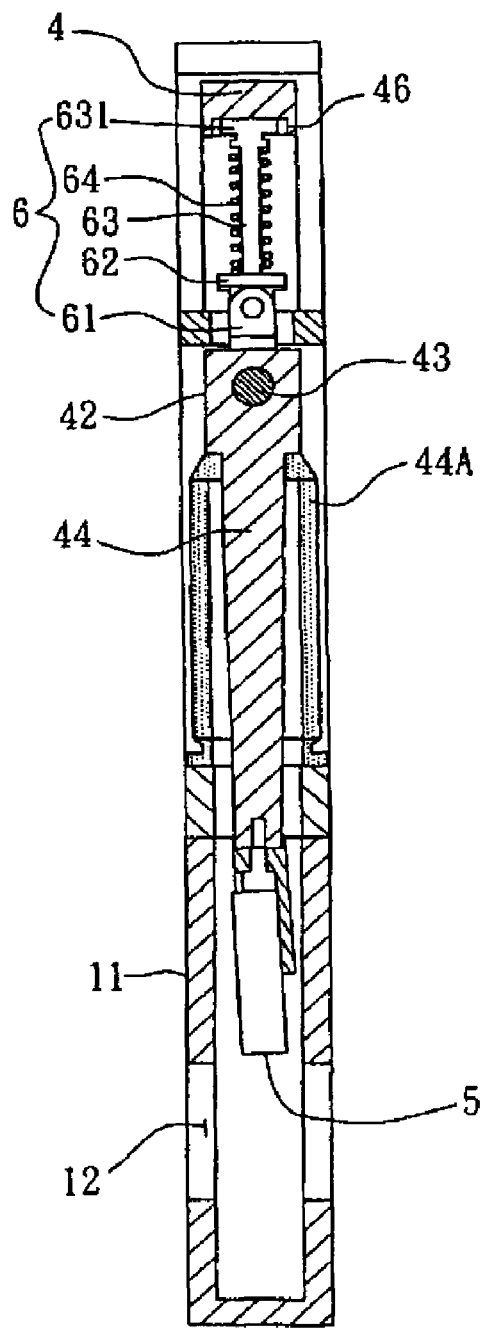
FIG. 8 is a sectional view of the second displacement element in accordance with the present invention.
Figure 9:
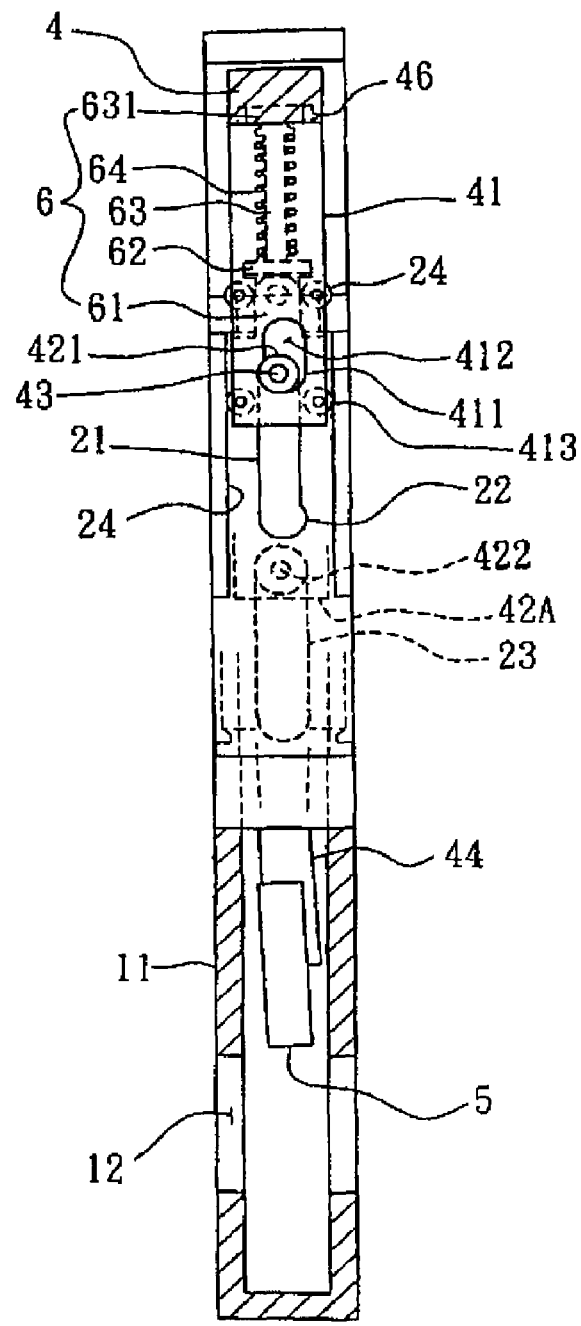
FIG. 9 is a sectional view of the guiding body module in accordance with the present invention.

FIGS. 7-9 of the present invention show a sealing valve structure, which comprises a valve seat 11 having fluid through hole 11 in communication front the front to the rear of the valve seat 11, a power element 3, an elevation section 4. The upper end of the valve seat 11 is connected to a vertical guide body 2, and the upper section of the guide body 2 is provided with a vertical guiding slot 21 passing through the left and right of the guiding body 2. The end of the lower side of the guiding slot 21 is tapered to form a slanting end 22 (as shown in FIG. 9). The guide body 2 at a position lower than the guiding slot 21 is provided in parallel a vertical directional guiding slot 23.

The power element 3 is mounted at the upper end of the valve seat 11 and is provided with an up and down retractable protruded rod 31.

The elevation section 4 is mounted at the upper end of the valve seat 11 and is connected and controlled by the end section of the protruded rod 31, and the elevation section 4 which is parallel to the guiding slot 21 is provided with a first displacement element 41, and the lower end of the first displacement element 41 is provided with a horizontal eccentric slot 411 (as shown in FIG. 9). The directional guiding slot 23 is arranged with a second displacement element 42, and the second displacement element 42 is protruding mounted with a directional terminal 422 slidably moving along the guiding slot 23 and is connected to the eccentric terminal 421, and the second displacement element 42 is downwardly extended to form a sealing element 5 for sealing and opening of the rear side of the fluid through hole 12 (referring to FIG. 8 showing the combination of the fluid through hole 12 and the sealing element 5).

The rear of the eccentric slot 411 at the lower end of the first displacement element 41 is facing backward and is upwardly raised to form a resisting slot 412 (resisting slot 412 is shown in FIG. 9). The upper end of the valve seat 11 corresponding to the through hole 12 is mounted with the power element 3 at the right and at the left, and the power element 3 is upwardly extended to form a protruded rod 31, the end section of the protruded rod 31 is connected to the lower side of the elevation section 4.

The guide body 2 is provided with a reciprocating slot 24 which is corresponding to the first displacement element 41, and a rolling element 413 is formed on the first displacement element 41 to contact with the wall of the reciprocating slot 24 (FIG. 9 shows the reciprocating slot and the rolling element 413). The middle of the elevation section 4 is provided with a second displacement element 42 and a shaft rod 43 passes through the left and right of the valve seat 11 and the right and left side of the second displacement element 42 are pivotally connected to an eccentric terminal 421, and the eccentric terminal 421 is connected to a guiding slot 21 having a guiding body 2 and to a eccentric slot 411 (FIG. 9 shows the installation of the guiding slot 21, the eccentric slot 411 and the eccentric terminal 421).

The left and right side of the second displacement element 42 are provided with a positioning plate 42A extended downwardly, and the positioning plate 42A is externally connected to the directional terminal 422, and the directional terminal 422 is sliding along the directional guiding slot 23 of the guiding body 2. In additional, the second displacement element 42 is mounted downwardly with an actuating rod 44 and the lower end of the actuating rod 44 is connected to a sealing element 5 (FIG. 8 shows the installation of the actuating rod 44 and the sealing element 5. Further, the upper end of the second displacement element 42 is a rotating element 6 having mounted with a rotating base seat 61, a pivoting body 62, an eccentric rod 63 and an elastic element 64, and the rotating base seat 61 is being mounted to the second displacement element 42 and the upper end of the base seat 61 is pivotally connected to the pivot body 62, and the pivot body 62 is connected to the eccentric rod 63, and the upper end of the eccentric rod 63 is mounted with a holding cap 631 with an extended surface, and the eccentric rod 63 is mounted with the elastic element 64, and the elastic element 64 is restricted at the pivot body 62 by the holding cap 631 and the holding cap 631 is upwardly mounted to a limiting chamber 46 at the elevation section 4.

Figure 10:
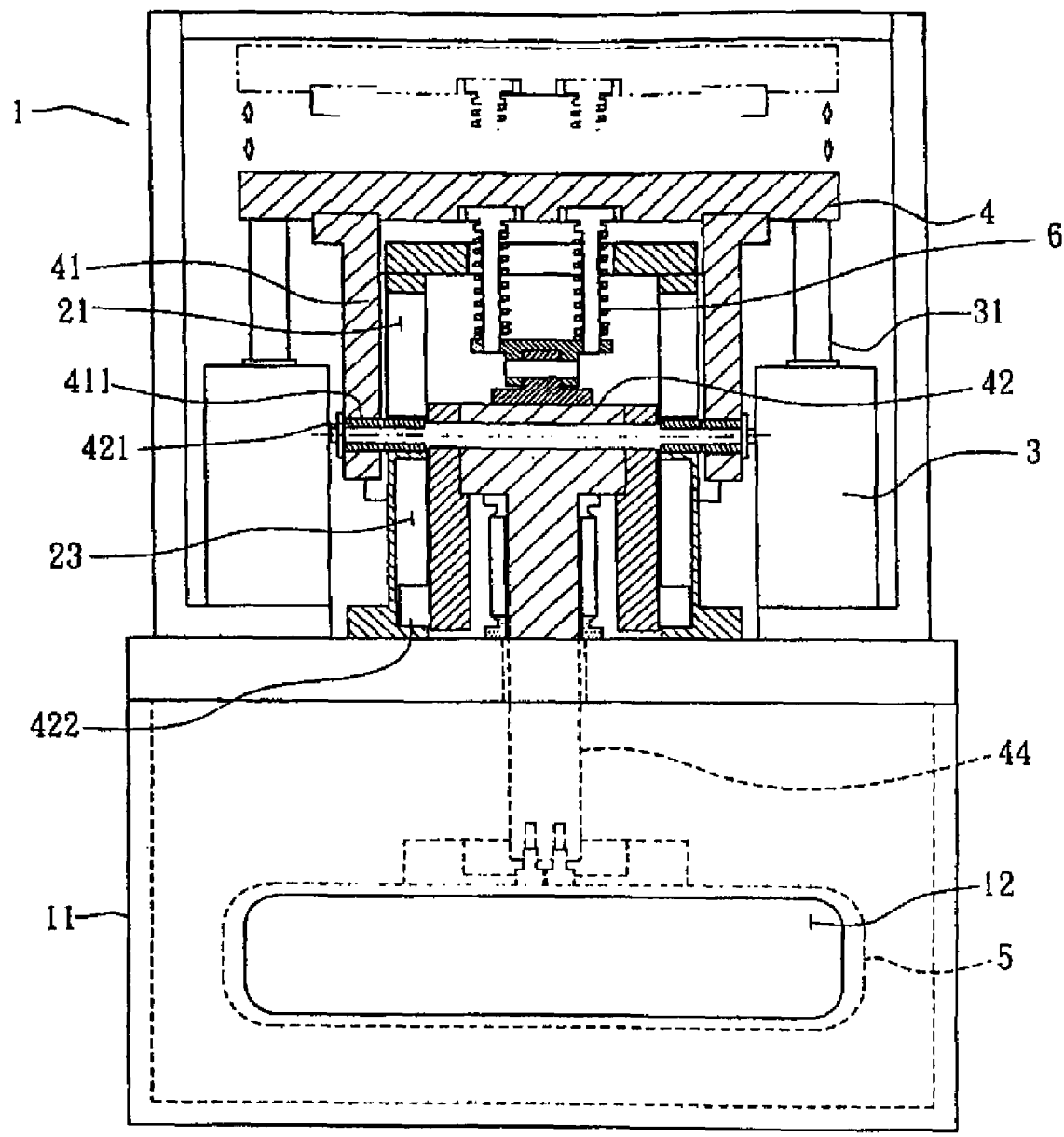
FIG. 10 is a schematic view showing the displacement in accordance with the present invention.

Referring to FIGS. 10, 11 and 12, the protruded rod 31 drives the elevation section 4 to move downward, and the eccentric terminal 421 and the directional terminal 422 slide at the guiding slot 21 and the directional guiding slot 23 (as shown in FIG. 11). When the directional terminal 422 contacts the end of the guiding slot 23, the pressure driven by the eccentric slot 411 causes the eccentric terminal 421 to move to the slanting slot end 22, and the eccentric terminal 421 is positioned at the slot end 22. When the eccentric terminal 421 urges the slot end 22, the sealing element 5 seals the real side of the fluid through hole 42 (as shown in FIG. 12). When the protruded rod 31 triggers the elevation section 4 to move upward, the engaged eccentric terminal 42 is released, and the eccentric terminal 421 under the aid of the rotating element 6 is moved to the guiding slot 21. At this point of time, the second displacement element 42 causes the sealing element 5 to disengage from the fluid through hole 12 and the elevation section 4 restores to the original position (see FIG. 11).

In accordance with the present invention, the worn out elements or components in the operation of the sealing element 5 are contained in the valve seat 11 and therefore precision and clarity problem in conventional sealing valve are not found. Another advantages of the present invention is that the sealing effect is precise due to the holding of the sealing element by the slot end 22 to the fluid through hole 12 and therefore the sealing of the through hole 12 is achieved without friction.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A sealing valve comprising
   a valve seat having fluid through holes in communication front the front to the rear of the seat and the upper end of the valve seat being connected to a vertical guide body, and the upper section of the guide body being provided with a vertical guiding slot passing through the left and right of the guiding body, and the end of the lower side of the guiding slot tapered to form a slanting end; the guiding body at a position being lower than the guiding slot provided in parallel with a vertical directional guiding slot;
   a power element mounted at the upper end of the valve seat and being provided with a up and down retractable protruded rod;
   an elevation section being mounted at the upper end of the valve seat and connected and controlled by the end section of the protruded rod; wherein
   the elevation section parallel to the guiding slot is provided with a first displacement element and the lower end of the first displacement element is provided with an eccentric slot, and the directional guiding slot is being angled with a second displacement element, and the second displacement element protruding mounted with a directional terminal is slidably move along the guiding slot, and the second displacement element downward is extended to form a sealing element for sealing and opening of the rear side of the fluid through hole.

2. The sealing valve of claim 1, wherein the eccentric slot is facing backward and is upwardly raised to form a resisting slot.

3. The sealing valve of claim 2, wherein the upper end of the valve seat corresponding to the fluid through hole is mounted with the power element, and the power element is upwardly extended to form a protruded rod, and the end section of the protruded rod is connected to the lower side of the elevation section.

4. The sealing valve of claim 3, wherein the middle of the elevation section is provided with a second displacement element and a shaft rod passing through the left and right of the valve seat is provided to the second displacement element, and the right and left side of the second displacement element are pivotally connected to an eccentric terminal, and the eccentric terminal is connected to a guiding slot having a guiding body and connected to an eccentric slot, the left and right side of the second displacement element are provided with a positioning plate extended downwardly, and the positioning plate is externally connected to the directional terminal, and the directional terminal is sliding along the directional guiding slot of the guiding body, and the second displacement element is mounted downwardly with an actuating rod and the lower end of the actuating rod is connected to a sealing element and the upper end of the second displacement element is a rotating element having mounted with a rotating base seat, a pivoting body, eccentric rod and an elastic element, and the rotating base seat is mounted to the second displacement element and the upper end of the base seat being pivotally connected to the pivot body, and the pivot body connected to the eccentric rod, and the upper end of the eccentric rod are mounted with a holding cap with an extended surface, and the eccentric rod is mounted with the elastic element, and the elastic element is restricted at the pivot body by the holding cap and the holding cap is upwardly mounted to a limiting chamber extended to the elevation section.

5. The sealing valve of claim 4, wherein the guiding body is further provided with a limiting, reciprocating slot to correspond with the first displacement element and the first displacement element is further mounted with rolling element which in contact with the lateral wall of the reciprocating slot.

6. The sealing valve of claim 1, wherein the actuating rod is mounted with a soft body to isolate dust from entering the valve seat.

* * * * *